INVENTORS
SOTIRI LUKA
EUGENE S. KORDYBAN
JAN F. REKAWEK

ATTORNEY

INVENTORS
SOTIRI LUKA
EUGENE S. KORDYBAN
JAN F. REKAWEK

BY *John C. ......*
ATTORNEY

INVENTORS
SOTIRI LUKA
EUGENE S. KORDYBAN
JAN F. REKAWEK

BY John P. Ledeva

ATTORNEY

United States Patent Office 3,361,284
Patented Jan. 2, 1968

3,361,284
THERMAL INSULATION CONSTRUCTION
Sotiri Luka, Tonawanda, Eugene S. Kordyban, Buffalo, and Jan F. Rekawek, Tonawanda, N.Y., assignors to Union Carbide Corporation, a corporation of New York
Filed Nov. 10, 1964, Ser. No. 410,231
7 Claims. (Cl. 220—9)

ABSTRACT OF THE DISCLOSURE

An insulation construction for large elongated casings housing process equipment operating at a substantial temperature differential from the temperature of the ambient atmosphere surrounding the casing which comprises means fastened to the inner wall of the casing for forming multiple vertically elongated compartments (cocoons) containing a filling of free-flowing insulation, e.g. perlite powder.

---

This invention relates to an improved thermal insulation system for vertical walled structures such as liquid storage tanks and casings for housing apparatus operating at a substantial temperature differential from the temperature of the ambient atmosphere surrounding the casing.

It has been suggested to insulate the walls of vertical structures by installing fibrous insulation of the bat type in multiple layers on the walls of such structures. Due to the relatively poor insulating qualities of this type of insulation it often requires many layers forming an insulation thickness of 12–18 inches or greater to reduce the heat inleak to an acceptable level. Moreover, since the installation of this type of insulation requires it to be installed manually in individual pieces the installation cost is considerable. This system has been superseded by the use of a low conductive powder insulation system in which the entire space not occupied by the equipment within the structure is filled with a bulk insulating material such as perlite powder or mineral wool fibers.

While this arrangement is generally satisfactory and economical for small to medium size structures, for large structures the quantity of insulating material required to completely fill the void spaces between the equipment and the walls of the structure becomes excessive and expensive. A further difficulty arises whenever the equipment within the structure requires servicing. In such case this large quantity of insulating material must be removed and stored while the equipment is being serviced, and then replaced thereafter. This necessitates the use of a large temporary storage structure such as a silo and accompanying expensive insulation handling equipment. In addition, the time required for the removal and replacement of such large quantities of insulating material may extend the required equipment shutdown period by two to four days each time the insulating material is removed and replaced. This added equipment downtime, if considered cumulatively, becomes quite significant over the lifetime of the process equipment.

An object of this invention is to provide an improved insulating system for large field-erected tankage such as liquid storage tanks and casings for housing apparatus operating at a substantial temperature differential from the temperature of the ambient atmosphere surrounding the casing.

Another object is to provide an improved insulation system employing a free-flowing insulating material, for a large field-erected casing housing equipment and wherein the casing may be entered and the equipment serviced without removing the insulating material.

Further objects and advantages of the invention will be apparent from the following disclosure and appended claims.

Figure 6:
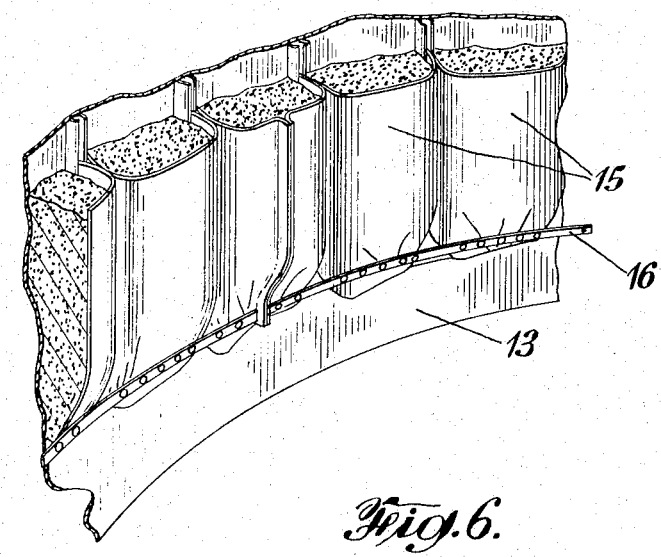
Figure 7:
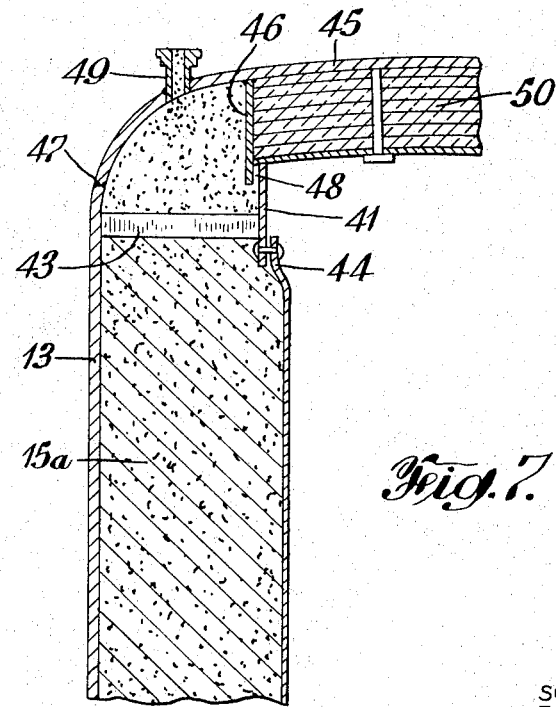

FIG. 6 is a isometric sectional view illustrating a means for closing off the lower end of each insulation compartment adjacent the bottom of a casing wall; and FIG. 7 is a longitudinal sectional view illustrating a preferred means for attaching an insulated cover onto the vertical walled casing and providing means for filling the compartment with insulation while simultaneously preventing the insulating material from leaking out of each compartment.

Corresponding items in the various figures have been identified by the same number in the interest of simplicity.

According to the present invention, an insulation construction is provided for a vertical walled structure comprising flexible means connected to the walls of the structure at closely spaced intervals for forming a multiplicity of adjacent contiguously associated individual elongated compartments. The compartments are arranged with the contiguous sides of adjacent compartments being joined to each other so as to form a continuous inner wall. Means are also provided for closing off the lower end of each compartment, and a free-flowing insulating material is provided, filling each of the compartments. The insulating material may consist, for example, of loose perlite powder, i.e. expanded volcanic glass, or mineral wool fibers, but may also consist of synthetic calcium silicate powder which has a lower thermal conductivity than perlite and mineral wool fibers. Insulating powders are usually preferred over larger particled material because of their lower thermal conductivity. Each compartment preferably extends for substantially the height of the wall to which it is attached, although multiple tiers of such compartments may be used end to end, if desired.

The compartments are preferably formed from thin relatively flexible metal sheeting because of its high strength, e.g. 0.010–0.060 inch thick metal sheets fastened together such as by bolting, riveting or spot welding.

If the insulation construction is to be employed in low temperature applications, the metal sheeting selected should remain relatively flexible at such temperatures, and not become brittle. Compartments formed of aluminum or stainless steel sheeting are well suited in such applications. Alternatively, the compartments may be formed from a more flexible material such as closely woven wire cloth, glass cloth, plastic or natural fiber cloth, plastic sheeting, or plastic coated fabrics. According to one embodiment of the invention the insulation compartments are fastened to the inner walls of a liquid storage tank. The compartments are formed of a material which is impervious to the stored liquid. In many applications, a sheeting material consisting of rubber coated or Teflon-coated canvas will be suitable because of their generally low reactivity and low porosity. To better protect the insulation material from the stored fluid, a flexible impervious inner liner may be used between the compartments and the fluid if desired.

The invention also contemplates the attachment of the insulation compartments to the external side of a casing or liquid storage tank. In such case the compartments would be sealed off at both ends and would be formed from a moisture-impervious material, e.g. thin stainless steel sheeting or neoprene-coated canvas.

When the casing is used to house apparatus operating at a substantial temperature difference from the temperature of the ambient atmosphere surrounding the casing, e.g. air separation equipment, the base of the casing is preferably covered with a low conductive powder insulation to a depth slightly above the lower end of the insulation-filled compartments.

Figure 1:
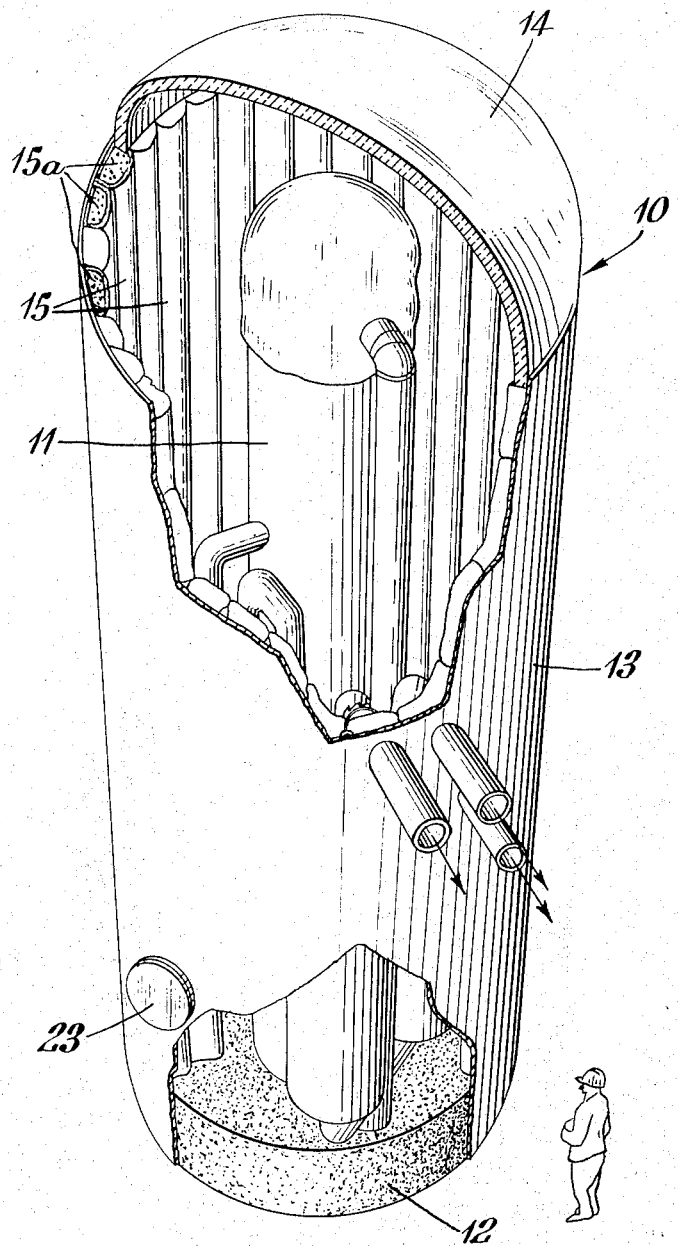
FIG. 1 is an isometric view of a large field-erected casing housing process equipment and illustrating the insulation system of the invention, parts being broken away to expose the insulation.

Referring now more specifically to FIG. 1, a large field-erected casing 10 is shown for housing apparatus 11 which is operable at a substantial temperature difference from the ambient temperature surrounding the casing. Equipment 11 may consist, for example, of heat exchanger apparatus utilized as part of an air separation plant. The casing 10 has a base 12, enclosed by vertical wall 13 and cover 14. Flexible means are provided for forming a multiplicity of adjacent contiguously associated individual elongated compartments 15 attached to the vertical wall 13 and extending for substantially the height of this wall. By referring to FIGURES 2 and 3, it will be noted that the compartments are arranged with the contiguous sides of adjacent compartments being joined, as by bolts or rivets 26, so as to form a continuous inner wall. This is an important requirement of the present invention because it prevents convection currents from coming into contact with the inner surfaces of rigid wall 13 between each two insulation compartments. When it is realized that the casings to be insulated may be as much as seventy-five feet high, it can be appreciated that convection currents caused by the normal chimney effect can be an important consideration. As shown more clearly in FIG. 6 means are provided, such as anchor strip 16 secured to the casing wall 13 by bolts or rivets, for closing off the lower end of each compartment. A free-flowing insulating material 15a such as perlite, mineral wool pellets or synthetic calcium silicate powder is used, filling each of the elongated compartments.

A free-flowing insulation material for purposes of this invention may be defined as a low conductive material which will flow readily into the insulation compartments without bridging and thereby causing void spots. Generally, insulations in pellet or powder form will be well suited for practicing the invention, while materials in bat or roll form should be excluded. To insulate the base of the casing, a loose powdered insulation, e.g. perlite, may be used as a covering, and preferably extends to a depth slightly above the lower end of each insulation compartment. Access opening 23 is conveniently provided to enable a service man to enter the casing. This opening may be confined to a portion of a single insulation compartment. Also, an insulated conduit may be passed through one or more compartments attached to the wall. Preferably, however, conduits should be passed through the casing at a point below the multiple insulation compartments, and thereafter surrounded with bulk insulating materials such as rock wool or perlite powder.

Figure 2:
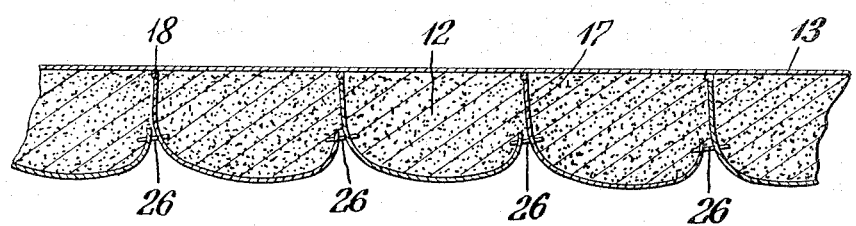
FIG. 2 is a plan view illustrated one embodiment of the compartment insulation of the invention, attached to a section of a flat wall.

As shown in FIG. 2, the insulation compartments may be formed of a flexible sheeting material, e.g. canvas, and consisting of a short portion 17 located substantially perpendicular to the rigid wall 13 and attached thereto by suitable means 18, to be described more particularly hereinafter, and a longer curved sheeting portion 19 attached at each end to portion 17. Portions 17 and 19 are preferably composed of a single width of sheeting and attached to the adjacent compartment as illustrated, or they may be individual compartments or tubes attached together. The method of attaching the sheets together will depend upon the material used and may consist, for example, of bonding, stitching or riveting. If sheeting material of constant thickness and strength is used, curved portion 19 will usually be made longer than portion 17 and the spacing between wall attachment points 18 will be limited by the maximum radius of curvature for portion 19, consistent with the strength of the material used. An important advantage of the thin partition member 17 is that the insulation load against portion 19 may be distributed uniformly, thus enabling an overall thinner material to be used. The ability to utilize thinner materials will in turn result in lower heat conduction through member 17. If the compartments are formed of a metal sheeting material because of higher strength requirements, e.g. aluminum, then at least the shorter portion 17 should be formed of a material having low thermal conductivity, e.g. stainless steel or reinforced plastic.

Figure 4:
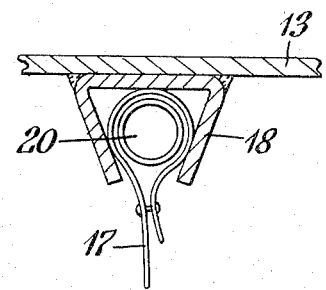
FIGS. 4 and 5 are plan views illustrating various clamping means for fastening the insulation compartments to the wall of a casing.
Figure 5:
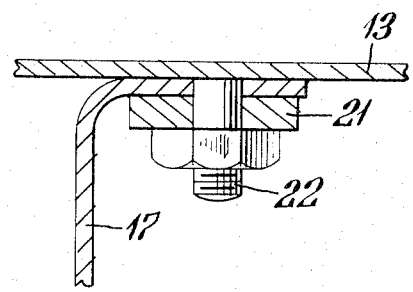

FIGURES 4 and 5 illustrate exemplary means for attaching the flexible sheeting portion 17 to wall 13. As shown in FIG. 4, sheeting portion 17 is wrapped loosely around rod 20 and retained in the channel shaped support bracket 18 which has a narrow opening to prevent the rod 20 from slipping out by horizontal movement. Support bracket 18 is permanently attached to wall 13, such as by welding. Another means for fastening the sheeting to the wall 13, as shown in FIG. 5, consists in clamping portion 17 to the rigid wall 13, by a metal strip 21 which is held in place by stud bolts 22 spaced apart as required.

The FIG. 4 attachment means is usually preferred since a section consisting of two or more tubes or compartments may be shop fabricated beforehand and easily installed in the field by slipping it horizontally into bracket 18 and thereafter inserting rod 20 vertically therethrough from the top of the wall. Each compartment would then be filled with a free-flowing insulating material such as perlite powder.

According to the present invention the insulation compartments may be preformed in sections consisting of several adjacent compartments and shipped in a roll to the field erection site. At the field site, the material would be unrolled and hung with a crane adjacent the wall to be insulated. In this form, the compartmented insulation consists of a multiplicity, of elongated loops fastened together, as by stitching, for example. The length of the loops may be substantially equal to the height of the wall to be insulated. The bottom of each loop may be sealably closed off as by stitching before shipment, or may be clamped off after erection as shown in FIGURE 6.

Figure 3:
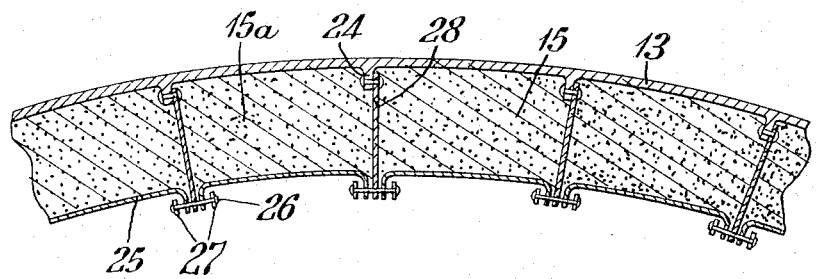
FIG. 3 is a plan view illustrating another embodiment of the compartmented insulation of the invention, attached to a section of a curved wall.
Figure 3A:
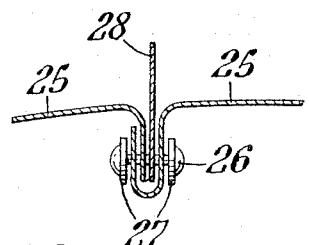
FIG. 3a is an enlarged plan view of a section of the inner walls of two adjacent compartments shown in FIG. 3, illustrating one method of sealably joining them together.

As shown in FIG. 3 the insulation compartments may be formed of thin metal sheeting such as .015 inch thick stainless steel, aluminum or other metals suitable for the temperature level encountered, and attached together by bolting, riveting or spot welding. According to this embodiment, the insulation filled compartments 15 consist of short radial thin low conductive sheet members 28 attached at spaced intervals preferably 18–48 inches apart, to rigid wall 13, such as by transition piece 24 welded thereto. The opposite end of each radial sheet 28 is attached to sheeting panels 25 such as by bolts or rivets 26 or by spot welding. If desired, reinforcing strip 27 may be attached to one or both of the flanges of panels 25. To provide a seal, one flange preferably has a double bend as shown in FIG. 3a. Alternatively, resilient gasket material may be placed between the mating panel members 25 to provide a seal for retaining the insulation in each compartment. If desired, the low conductive radial sheeting members 28 may be formed of a non-metallic material, such as reinforced plastic.

An important requirement of this embodiment, as aforementioned, is that the adjacent compartments be arranged to form a contiguous and continuous inner wall around the casing. Thus, the contiguous sides of adjacent compartments are joined, as by bolts 26. The formation of a continuous inner wall is important in order to minimize the effects of convection currents caused by the normal "chimney effect" in high casings.

A major advantage gained by using individual insulation compartments is that leakage of insulation from any one compartment will not effect a loss of insulation from any other compartment. Also, by utilizing materials which are relatively flexible, installation is relatively simple and thus the cost can be kept low.

FIG. 7 shows a preferred means for attaching an insulated cover to the rigid casing wall 13. As shown therein metal partition 41 is supported from rigid casing wall 13 at its upper end, by radial struts 43. The upper end of each flexible compartment is attached to the lower end of partition 41 for support thereof such as by bolts 44. The cover 45, which is preinsulated such as with layered insulation 50 attached thereto, and enclosed by vertical partition 46 near its outer edge, is next installed in place and attached to the rigid wall 13 at outer point 47, such as by welding. A slidable seal for retaining the free-flowing insulation is also made at inner point 48. The free-flowing insulation material 15a may then be filled into the compartments from the outside of the casing through multiple spaced closable nozzles 49, which communicate with the multiple insulation compartments.

The seal joint 48 is preferably formed by positioning the second vertical partition 41 with its upper edge in overlapping relationship with the lower edge of the first vertical partition 46. Vertical partition 41 is supported by spaced brackets 43 affixed at one end to rigid wall 13, and the sheeting forming the insulation compartments is attached to the vertical partition 41 for support, at 44.

When thin metal sheeting is utilized in forming the insulation compartments, vertical partition 41 and radial struts 43 may be eliminated if desired and the sheeting attached to its radial partition 28 so as to form an overlapping seal joint with vertical partition 46. To close off the bottom end of each compartment, a panel shaped to conform to the cross-section of the compartment may be sealably attached to the bottom end, as by bolting, riveting or spot welding. The type of overlapping joint illustrated in FIGS. 3 and 3a may also be used with success.

For long insulation compartments for which the allowable strength of the sheeting utilized may be exceeded, multiple courses or tiers of compartments should be used.

In another useful embodiment of this invention, the insulation-filled compartments are attached to the external surface of a curved wall or casing. Using this construction, insulated cylindrical storage tanks for cold liquefied gases such as methane may be constructed economically, since only a single structural wall is required. The wall must be impervious to the stored fluid and not damaged by the temperature of the liquid, and may consist of welded metal, prestressed concrete, or similar material. For outdoor use, the insulation-containing compartments should be closed off at both ends, and should be made of a weather resistant material and employ a suitable sealant at the seams in order to prevent atmospheric moisture from entering the compartment and causing deterioration of the insulation quality. A suitable sheeting material is plastic or rubber impregnated fabric such as neoprene-coated or Teflon-coated canvas. Thin corrosion resistant metal sheeting may also be used with success.

Some of the advantages of the compartmental insulation construction of the present invention are: (1) the quantity of powdered insulation material which can leak out if the insulation retaining sheet is punctured is limited; (2) if it becomes necessary to remove large equipment from inside the casing, the insulation material need be removed from only that portion of the casing wall which is affected and (3) a serviceman may enter the casing through the manhole provided without first removing and storing the particled insulation therein.

Although this invention has been described with regard to an insulation construction for low temperature applications it is also useful in above-ambient temperature applications. For example, multiple insulation compartments may be attached to the outer walls of a furnace.

As used throughout the specification, the term vertical wall may be defined as a wall having an inclination with respect to a vertical axis which permits the compartment to be filled by gravity with the particled insulation material.

What is claimed is:

1. An improved thermal insulation construction for a rigid walled structure mounted upon a horizontal base, which construction comprises horizontally spaced vertical wall portions affixed to and extending laterally from one surface of the wall structure and sheeting panels joining the free vertical edges of said vertical wall portions so as to form a continuous inner wall and a multiplicity of adjacent contiguously associated vertically elongated separate compartments; means closing off the lower end of each compartment above the bottom end of the rigid wall in vertically spaced relation to said base; and low conductive free-flowing insulating material disposed within each of said compartments.

2. An improved thermal insulation construction according to claim 1 wherein the base of said structure is covered with low conductive insulating material to a depth slightly above the lower end of the compartments containing insulating material.

3. An improved thermal insulation construction according to claim 1 wherein metal sheeting having a thickness between 0.010 and 0.060 inch forms the vertical wall portions and the sheeting panels forming said compartments.

4. An improved thermal insulation construction according to claim 1 wherein said rigid walled structure is a liquid storage tank and wherein said vertical wall portions and sheeting panels of said compartments are formed of material which is impervious to the stored liquid.

5. An improved thermal insulation construction according to claim 1 wherein a cover is attached to the rigid wall structure, said cover containing an insulation material with its edge enclosed by a first vertical partition attached to the underside of said cover near its edge; a second vertical partition supported from the rigid wall structure and positioned with its upper edge in overlapping relationship with the lower edge of said first vertical partition to form a slidable seal therebetween, the vertically elongated insulation compartments are suspended from said second partition and insulation material filling means communicating with said elongated compartments.

6. An improved thermal insulation construction as claimed in claim 1 wherein said vertical wall portions and the sheeting panels forming said compartments are integral and formed of thin stainless steel sheeting.

7. An improved thermal insulation construction according to claim 6 wherein a cover is attached to the rigid wall structure, said cover containing an insulation material with its edge enclosed by a vertical partition attached to the underside of said cover near its edge; vertically elongated insulation compartments formed of thin metal sheeting and supported from said wall of structure and disposed with its upper edge in overlapping relationship with the lower edge of said vertical partition to form a slidable seal therebetween, and insulation material filling means communicating with said multiple compartments.

References Cited

UNITED STATES PATENTS

| | | | |
|---|---|---|---|
| 1,614,411 | 1/1927 | Thomson | 52—404 |
| 1,930,285 | 10/1933 | Robinson | 220—15 |
| 2,323,297 | 7/1943 | Collins | 52—269 |
| 2,365,086 | 12/1944 | Kamowski | 220—9 |
| 2,418,758 | 4/1947 | Cooper | 52—409 |
| 2,576,698 | 11/1951 | Russum | 220—9 |
| 2,999,366 | 9/1961 | Lafave et al. | 220—9 |
| 3,125,192 | 3/1964 | Ramseur | 220—15 |
| 3,209,503 | 10/1965 | Mostoller | 52—404 |

JOSEPH R. LECLAIR, *Primary Examiner.*

J. R. GARRETT, *Assistant Examiner.*